(12) United States Patent
Egorova et al.

(10) Patent No.: US 11,615,010 B2
(45) Date of Patent: Mar. 28, 2023

(54) MANAGING CONSUMABLES USING ARTIFICIAL INTELLIGENCE

(71) Applicant: Micron Technology, Inc., Boise, ID (US)

(72) Inventors: Marta Egorova, Boise, ID (US); Mandy W. Fortunati, Boise, ID (US); Srinivasa Anuradha Bulusu, Boise, ID (US); Kathryn H. Russo, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 18 days.

(21) Appl. No.: 17/233,637

(22) Filed: Apr. 19, 2021

(65) Prior Publication Data

US 2022/0334942 A1    Oct. 20, 2022

(51) Int. Cl.
*G06F 11/00* (2006.01)
*G06F 11/30* (2006.01)
*G06F 11/34* (2006.01)
*G06F 11/32* (2006.01)

(52) U.S. Cl.
CPC ...... *G06F 11/3089* (2013.01); *G06F 11/3075* (2013.01); *G06F 11/328* (2013.01); *G06F 11/3466* (2013.01)

(58) Field of Classification Search
CPC .. G06F 11/3452; G06F 11/008; G06F 11/079; G06F 11/0709; G06F 11/3466; G06F 11/3058; G06F 11/3409; G06F 11/0766; G06F 11/0793; G06F 11/3447
See application file for complete search history.

(56) References Cited

U.S. PATENT DOCUMENTS

| | | | |
|---|---|---|---|
| 9,134,675 B2 | 9/2015 | Yang | |
| 10,325,312 B2 | 6/2019 | Lee | |
| 10,769,708 B2 | 9/2020 | Alvo | |
| 10,837,974 B2 | 11/2020 | Postma | |
| 2002/0010659 A1 | 1/2002 | Cruse | |
| 2019/0087917 A1* | 3/2019 | Devarakonda | G06Q 10/04 |
| 2019/0155712 A1* | 5/2019 | Tiwari | G06N 3/0427 |
| 2020/0393475 A1* | 12/2020 | Hall | E03D 11/16 |
| 2021/0191799 A1* | 6/2021 | Valvassori | G06F 11/2263 |
| 2021/0365311 A1* | 11/2021 | Cherry | H04N 1/00029 |

* cited by examiner

*Primary Examiner* — Charles Ehne
(74) *Attorney, Agent, or Firm* — Brooks, Cameron & Huebsch, PLLC

(57) ABSTRACT

A method includes receiving, at an artificial intelligence (AI) accelerator of a computing system, at least one of: manufacturer data, third-party data, sensor data, or primary usage data of a consumable in a primary device and performing an AI operation on at least one of: the manufacturer data, the third-party data, the sensor data, or the primary usage data at the AI accelerator of the computing system using an AI model. The method further includes determining a primary life expectancy of the consumable in the primary device at the AI accelerator in response to performing the AI operation.

20 Claims, 5 Drawing Sheets

MANAGING CONSUMABLES USING ARTIFICIAL INTELLIGENCE

TECHNICAL FIELD

Embodiments of the disclosure relate generally to managing consumables, and more specifically, relate to managing consumables using artificial intelligence (AI).

BACKGROUND

A computing system can be a smartphone, a wearable device, a tablet, a laptop, a desktop computer, or a smart assistant device, for example. The computing system can receive and/or transmit data and can include or be coupled to one or more memory devices. Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random-access memory (DRAM), static random-access memory (SRAM), synchronous dynamic random-access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random-access memory (RRAM), and magnetoresistive random access memory (MRAM), such as spin torque transfer random access memory (STT RAM), among others.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to managing consumables using artificial intelligence (AI), in particular to memory sub-systems that include a memory sub-system AI acceleration component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

Many devices, including household, commercial, automotive, medical, and infrastructure devices, include a consumable. A consumable can be a part that is used up and then replaced. For example, batteries, light bulbs, filters, liquids, and/gases can be consumables. Often consumables are discarded instead of recycled or reused because a user doesn't know how much usable consumable is left and/or where the consumable can be recycled or reused.

In some approaches, consumables can be depleted unexpectedly and/or without warning, which can cause a device including the consumable to no longer function or to malfunction. A nonoperational device or a malfunctioning device can cause damage to the device and/or harm to property, animals, and/or people.

Aspects of the present disclosure address the above and other deficiencies by identifying reusable consumables for reusing in secondary devices, creating recycling instructions, tracking and predicting life expectancies of consumables, and/or alerting a user, operator, and/or computing device that a consumable needs to be replaced or maintained. For example, an AI accelerator can determine a life expectancy of a battery in a primary device based on battery data from the battery manufacturer, battery data from third parties (e.g., other battery users), sensor data from the device using the battery, sensor data from a sensor in the same environment as the battery, and/or usage data from the device using the battery.

Figure 1:
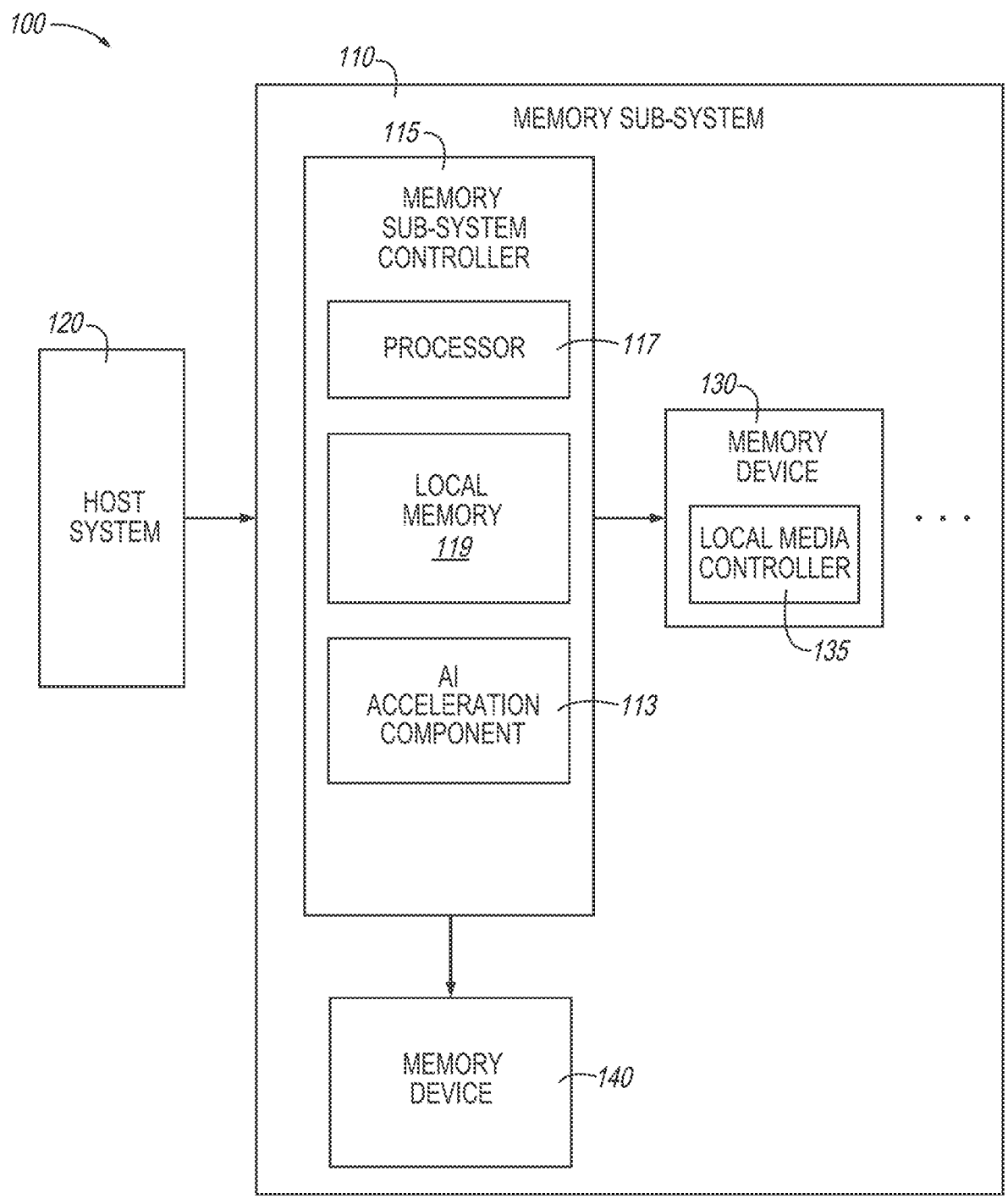
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell.

In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include an AI acceleration component 113. The AI acceleration component 113 can be referred to in the alternative as an "AI accelerator." Although not shown in FIG. 1 so as to not obfuscate the drawings, the AI acceleration component 113 can include various circuitry to facilitate performance of AI operations to manage consumables, as described herein. In some embodiments, the AI acceleration component 113 can include special purpose circuitry in the form of an ASIC, FPGA, state machine, and/or other logic circuitry that can allow the AI acceleration component 113 to orchestrate and/or perform operations described herein involving the memory device 130 and/or the memory device 140.

In some embodiments, the memory sub-system controller 115 includes at least a portion of the AI acceleration component 113. For example, the memory sub-system controller 115 can include a processor 117 (processing device) configured to execute instructions stored in local memory 119 for performing the operations described herein. In some embodiments, the AI acceleration component 113 is part of the host system 110, an application, or an operating system.

In a non-limiting example, an apparatus (e.g., the computing system 100) can include an AI acceleration component 113. The AI acceleration component 113 can be resident on the memory sub-system 110. As used herein, the term "resident on" refers to something that is physically located on a particular component. For example, the AI acceleration component 113 being "resident on" the memory sub-system 110 refers to a condition in which the hardware circuitry that comprises the AI acceleration component 113 is physically located on the memory sub-system 110. The term "resident on" can be used interchangeably with other terms such as "deployed on" or "located on," herein.

Figure 2:
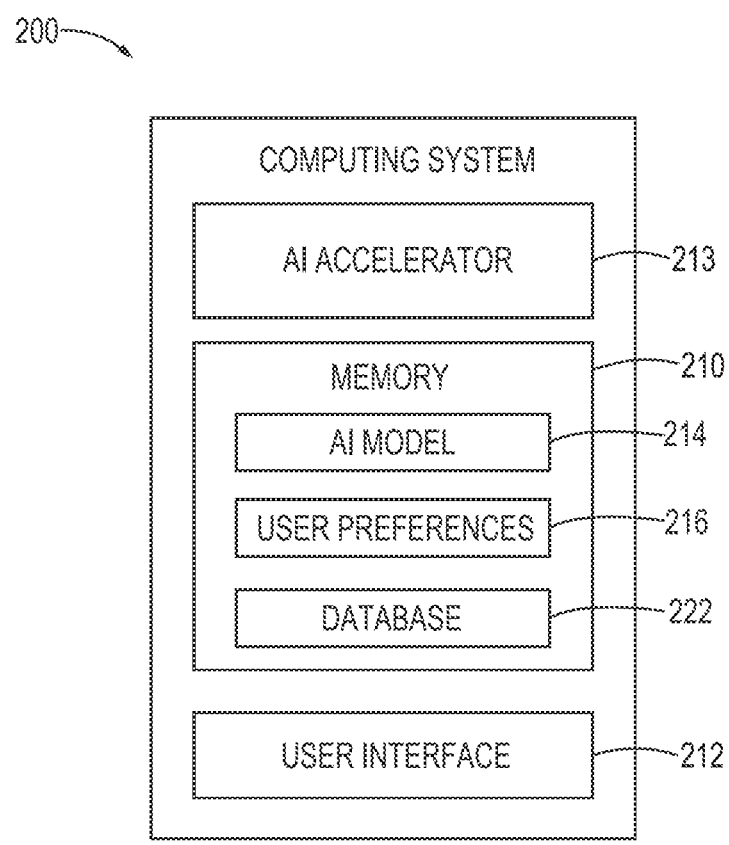
FIG. 2 illustrates an example computing system that includes an AI accelerator in accordance with some embodiments of the present disclosure.

FIG. 2 illustrates an example computing system 200 that includes an AI accelerator 213 in accordance with some embodiments of the present disclosure. AI accelerator 213 can correspond to AI acceleration component 113 of FIG. 1. The AI accelerator 213 can include hardware, software, and/or firmware that is configured to enable the computing system 200 to perform operations (e.g., logic operations, among other operations) associated with AI operations using one or more AI models. In some embodiments, AI operations can include machine learning or neural network operations, which can include training operations or inference operations, or both.

Data stored in memory sub-system (e.g., memory) 210 of the computing system 200 and/or external to the computing system 200 can be used in performing the AI operations. In some embodiments, the memory sub-system 210 can also store an AI model 214, user preferences 216, and/or a database 222.

The AI model 214 can be trained on the computing system 200 and/or remotely. For example, the AI model 214 can be trained remotely in a cloud and transmitted to the computing system 200. Usage data and/or sample data, which can include third-party data and/or manufacturer data, for example, can be used to train the AI model 214. In some embodiments, a cloud and/or an AI accelerator 213 can include train parameters to train the AI model 214. Train parameters can include a life span distribution of one or more consumables, a list of uses of one or more consumables, and/or a list of devices that use one or more consumables.

The computing system 200 can include a user interface 212. The user interface 212 can be generated by the computing system 200. The user interface 212 can be a graphical user interface (GUI) that can provide and receive information to and/or from the user of the computing system 200. In some approaches, the user interface 212 can be shown on a display of the computing system 200.

The computing system 200 can be coupled to one or more devices, for example a primary device. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like. The primary device can be a computing device including a consumable.

The AI accelerator 213 of the computing system 200 can receive data from one or more devices including the primary device. Inputted data (e.g., received data) can be manufacturer data, third-party data, sensor data, and/or primary usage data of the consumable in the primary device. The AI accelerator 213 can perform an AI operation on all or a portion of the inputted data.

In some approaches, the AI accelerator 213 can determine a primary life expectancy of the consumable in the primary device in response to performing the AI operation. The primary life expectancy can be an amount of time until the consumable will be spent, unusable, and/or no longer properly functioning in the primary device. For example, a furnace filter can have a primary life expectancy of three months based on the manufacturer data. However, the AI accelerator 213 can determine the primary life expectancy of the furnace filter is more or less than three months based on the third-party data, the sensor data, and/or the primary usage data.

In some embodiments, the AI accelerator 213 can receive a database 222 including data corresponding to one or more devices. For example, the database 222 can include devices located within a home, an office, a manufacturing plant, or a city. Each device in the database 222 can use one or more consumables. The database 222 can include manufacturer data, third-party data, sensor data, and/or usage data for each device and/or each consumable. The AI accelerator 213 can use the manufacturer data, the third-party data, the sensor data, and/or the usage data for one or more devices and/or one or more consumables to perform AI operations. The AI accelerator 213 can determine a usage for each device in the database 222. In some approaches, the AI accelerator 213 can compare a secondary usage of a consumable to the usage of each device in the database 222 and identify a secondary device from the database 222 in response to matching the secondary usage of the consumable to the usage of the secondary device.

The secondary usage of the consumable can be utilizing the consumable for the same or different purpose in a secondary device. The secondary usage can be less vital than the primary usage. For example, if the consumable is a battery in a medical device, the battery can purposefully be replaced prior to the battery dying to prevent the user of the medical device from being physically harmed in response to the medical device malfunctioning or no longer functioning due to the battery dying. The AI accelerator 213 can recommend using the battery in a secondary device, for instance, a remote where no physical harm can come to the user when the battery dies.

In some approaches, the secondary usage can have less stringent requirements for the consumable than the primary usage of the consumable. For example, the primary usage can require the consumable to be operating all night each night and the secondary usage can require the consumable to be operating less than an hour per day. If the consumable is an outdoor lightbulb that has a primary usage to turn on at dusk and turn off at dawn, the AI accelerator 213 can recommend a secondary usage of the outdoor lightbulb to turn on only when motion is detected and turn off when motion is no longer detected or turn off after a particular time period has passed since detecting the motion.

A secondary device may be able to receive a consumable as is or after the consumable has been modified. In some approaches, the AI accelerator 213 can provide directions to modify the consumable for use in the secondary device. For example, the AI accelerator 213 could provide directions, dimensions, and/or a template for the user to modify the consumable to fit into the secondary device via the user interface 212. The AI accelerator 213 may be able to create directions, dimensions, or templates based on manufacturing data of the secondary device and/or the consumable. In some approaches, the AI accelerator 213 can identify a secondary usage and/or a secondary device for the consumable and convey the secondary usage and/or the secondary device to a user via the user interface 212 of the computing system 200. For example, the AI accelerator 213 can identify and convey a craft project for kids via the user interface 212 that reuses a light bulb to create an ornament.

The user interface 212 can provide a list of secondary usages and/or secondary devices. The AI accelerator 213 can list the secondary usages and/or the secondary devices in a particular order on the user interface 212. For example, the user interface 212 can display the most common secondary usages and/or secondary devices towards the top of a list. A user can select, via the user interface 212, the secondary usage and/or the secondary device they are planning to use.

The AI accelerator 213 can store the selection in memory 210 and/or modify the particular order of the secondary usages and/or the second devices based on the user's selection.

In some embodiments, the AI accelerator 213 can determine a primary life expectancy of the consumable based on the manufacturer data, the third-party data, the sensor data, or the primary usage data of the consumable in the primary device. The AI accelerator 213 can determine a primary life of a consumable has ended based on the manufacturer data, the third-party data, the sensor data, or the primary usage data of the consumable in the primary device. The AI accelerator 213 can determine the primary life of the consumable has ended in response to the consumable reaching a threshold primary life expectancy set by the manufacturer and/or the user, the consumable being used up, and/or the consumable being degraded to the point of causing or soon to be causing the primary device to malfunction or no longer function.

In some embodiments, user preferences 216 can be stored in memory 210. The user preferences 216 can be set and/or modified by the manufacturer or the user. The AI accelerator 213 can perform AI operations using the user preferences 216. The threshold primary life expectancy of the consumable can be a user preference 216, for example, to prevent the primary device from malfunctioning or no longer functioning due to the consumable not being replaced in time. User preferences 216 can include a budget, a carbon footprint goal, and/or a level of performance for the device. Operations can be performed and/or notifications can be displayed on the user interface 212 in response to performing AI operations using user preferences 216.

In some approaches, the user interface 212 can display a notification that the primary life of the consumable has ended, the primary life of the consumable is soon to end, that the consumable needs to be replaced, and/or a replacement consumable has been ordered in response to the AI accelerator 213 determining the primary life of the consumable has ended or is soon to end. The AI accelerator 213 can purchase a replacement consumable in time for the replacement consumable to be shipped and replaced prior to the primary device malfunctioning or no longer functioning due to the consumable not being replaced in time. The AI accelerator 213 can determine the replacement consumable based on the manufacturer data and/or the third-party data of the replacement consumable and based on the user's budget, carbon footprint goal, and/or the level of performance for the device. For example, the AI accelerator 213 can select the replacement consumable that fits the primary device based on the manufacturer data, that is highly rated according to the third-party data, that is within the user's budget, and/or that is certified as energy efficient.

A notification can also be displayed on the user interface 212 in response to the consumable requiring maintenance. For example, the AI accelerator 213 can determine one or more maintenance operations need to be performed on the consumable to ensure the consumable is functioning properly and/or effectively. The AI accelerator 213 can determine that one or more maintenance operations are needed based on the manufacturer data, the third-party data, the sensor data, or the primary usage data of the consumable in the primary device. For example, third-party data can include data that suggests the primary device can be most efficient if the consumable is cleaned once a month. Accordingly, the AI accelerator 213 can determine to display a notification on the user interface 212 once a month to remind the user to clean the consumable.

Over time, the AI accelerator 213 can determine the consumable may only need to be cleaned every other month. For example, if the user does not clean the consumable and the primary usage data suggests that the efficiency of the primary device is not reduced for two months, the AI accelerator 213 can remind the user to clean the consumable every other month instead of every month.

In some embodiments, the AI accelerator 213 can provide a notification including a recommendation to change settings of the primary device. The recommendation to change settings can be to allow the primary device to meet a budget, a carbon footprint goal, or a level of performance, for instance, established by the user preferences 216. For example, the AI accelerator 213 can send a command to dim light bulbs in a house for the rest of the month to reduce the user's electrical bill to allow the user to meet their monthly budget.

In some embodiments, a consumable may not be able to be reused. In response to the AI accelerator 213 determining the consumable is not able to be reused, the AI accelerator 213 can create discard instructions based on the manufacturer data, the third-party data, the sensor data, and/or the primary usage data. In some approaches, a consumable can include hazardous materials that may not be able to be disposed of via a normal garbage service. The AI accelerator 213 can instruct the user to dispose of the consumable at a particular location and provide the user with directions to the particular location via the user interface 212.

In some embodiments, the consumable may be able to be recycled. The AI accelerator 213 can instruct the user to recycle the consumable in their recycling bin or can instruct the user to drop off the consumable at a particular recycle center. In some approaches, the AI accelerator 213 can provide the user with directions to the particular recycle center and provide the user with days and/or hours of operation of the recycle center via the user interface 212.

Figure 3:
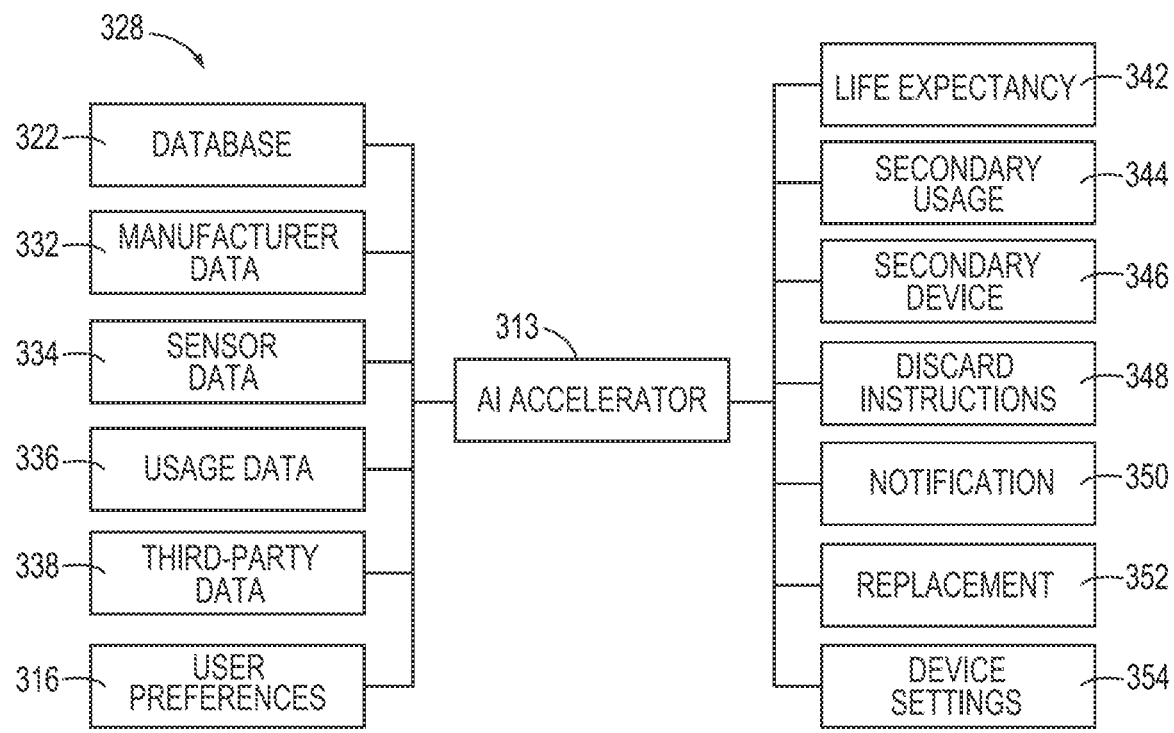
FIG. 3 is a flow diagram corresponding to an AI accelerator performing AI operations in accordance with some embodiments of the present disclosure.

FIG. 3 is a flow diagram 328 corresponding to an AI acceleration component 113 illustrated in FIG. 1 and/or AI accelerator 213 illustrated in FIG. 2 performing AI operations in accordance with some embodiments of the present disclosure. At operation 313, AI operations can be performed on inputted data. The inputted data can include data from database 322, manufacturer data 332, sensor data 334, usage data 336, third-party data 338, and/or data corresponding to user preferences 316. The AI accelerator can determine a life expectancy 342 of the consumable, a secondary usage 344 of the consumable, and/or a secondary device 346 to use the consumable at operation 313. In some embodiments, the AI accelerator at operation 313 can create (e.g., generate) discard instructions 348 for the consumable and/or a notification 350. A replacement 352 of the consumable can be ordered and/or device settings 354 can be set and/or reset by the AI accelerator at operation 313.

In some embodiments, at operation 313 the AI accelerator can receive data from a database 322. The database 322 can include devices located within a home, an office, a manufacturing plant, or a city. Each device in the database 322 can use one or more consumables. The database 322 can include manufacturer data, third-party data, sensor data, and/or usage data for each device. At operation 313 the AI accelerator can use the manufacturer data 332, the third-party data 338, the sensor data 334, and/or the usage data 336 for one or more devices to perform AI operations to compare a secondary usage 344 of a consumable to the usage of each device and identify a secondary device 346 from the database 322 in response to matching the secondary usage 344 of the consumable to the usage of the secondary device 346.

Manufacturer data 332 can be data received from the manufacturer of the consumable. Specifications, dimensions, characteristics, testing information, identification information (e.g., lot number, serial number, part number, etc.), and/or materials of the consumable can be included in the manufacturer data 332. At operation 313, the AI accelerator can use the manufacturer data 332 to perform AI operations to determine the life expectancy 342 of the consumable, a secondary usage 344 of the consumable, and/or a secondary device 346 to use the consumable, create discard instructions 348 for the consumable and/or a notification 350, order a replacement consumable 352, and/or set device settings 354.

Sensor data 334 can be data gathered from a sensor coupled to or near (e.g., in the same environment as) the primary device using the consumable. A sensor can measure humidity, temperature, noise, vibration, airflow, and/or proximity, for example. A consumable can degrade or be used up at a particular rate based on the environment the consumable is in and/or based on the use of the consumable. Accordingly, at operation 313, the AI accelerator can use the sensor data 334 to perform AI operations to determine the life expectancy 342 of the consumable, a secondary usage 344 of the consumable, and/or a secondary device 346 to use the consumable, create discard instructions 348 for the consumable and/or a notification 350, order a replacement consumable 352, and/or set device settings 354.

Usage data 336 can be gathered by the primary device using the consumable. Energy consumption and/or settings of the primary device, for example, can be included as usage data 336. At operation 313, the AI accelerator can use usage data 336 to perform AI operations to determine the life expectancy 342 of the consumable, a secondary usage 344 of the consumable, and/or a secondary device 346 to use the consumable, create discard instructions 348 for the consumable and/or a notification 350, order a replacement consumable 352, and/or set device settings 354.

The third-party data 338 can be gathered by other devices that use the identical or similar consumable. The third-party data 338 can include information corresponding to a life of an identical or similar consumable, the settings of the other devices that used the identical or similar consumable, and/or the performance and/or efficiency of the other devices that used the identical or similar consumable. At operation 313, the AI accelerator can use third-party data 338 to perform AI operations to determine the life expectancy 342 of the consumable, a secondary usage 344 of the consumable, and/or a secondary device 346 to use the consumable, create discard instructions 348 for the consumable and/or a notification 350, order a replacement consumable 352, and/or set device settings 354.

The user preferences 316 can be set and/or modified by the manufacturer or the user. User preferences 316 can include a budget, a carbon footprint goal, or a level of performance for the device, for example. At operation 313, the AI accelerator can use user preferences 316 to perform AI operations to determine the life expectancy 342 of the consumable, a secondary usage 344 of the consumable, and/or a secondary device 346 to use the consumable, create discard instructions 348 for the consumable and/or a notification 350, order a replacement consumable 352, and/or set device settings 354.

The primary life expectancy 342 can be an amount of time until the consumable will be spent, unusable, and/or no longer properly functioning in the primary device. For example, a light bulb can have a primary life expectancy of seven years based on the lifetime of identical or similar light bulbs provided by third-party data. However, at operation 313, the AI accelerator can determine the primary life expectancy of the light bulb is six years if the light bulb is used on average one hour more per day than the identical or similar light bulbs provided by the third-party data 338.

The secondary usage 344 of the consumable can be utilizing the consumable for the same or different purpose in a secondary device. For example, if the consumable is propane gas for heating a space, the propane gas may purposefully be replaced prior to the propane gas running out to prevent the temperature of the space from falling below a particular temperature. At operation 313, the AI accelerator can recommend using the unused propane gas for grilling as a secondary usage 344, for example.

The secondary device 346 can be a device that can use the consumable for a secondary usage 344. For example, the consumable can be a furnace filter and the primary device can be a house furnace. At operation 313, the AI accelerator can determine using, for instance, data from database 322, manufacturer data 332, sensor data 334, usage data 336 and/or user preferences 316 that the furnace filter can be reused by a garage furnace as the secondary device 346.

In some embodiments, a consumable may not be able to be reused. At operation 313, the AI accelerator may determine the consumable is not able to be reused based on the manufacturer data and/or the data from database 322. In response to the AI accelerator determining that the consumable is not able to be reused, at operation 313, the AI accelerator can create discard instructions 348 based on the manufacturer data 332, the third-party data 338, the sensor data 334, and/or the primary usage data 336, for example.

In some approaches, the AI accelerator at operation 313 can create a notification 350 that the primary life of the consumable has ended, the primary life of the consumable is soon to end, that the consumable needs to be replaced, and/or a replacement consumable has been ordered in response to the AI accelerator determining the primary life of the consumable has ended or is soon to end. The AI accelerator can send a command to the user interface 106 illustrated in FIG. 1 to display the created notification 350 in response to creating the command and the user interface can display the notification 350 in response to receiving the command.

The AI accelerator at operation 313 can recommend and/or purchase a replacement consumable 352. In some approaches, the replacement consumable 352 can be recommended and/or purchased in time for the replacement consumable to be shipped and replaced prior to the primary device malfunctioning or no longer functioning due to the consumable not being replaced in time. The AI accelerator at operation 313 can determine the replacement consumable 352 based on the manufacturer data and/or the third-party data of the replacement consumable 352 and based on the user's budget, carbon footprint goal, and/or the level of performance for the device.

In some embodiments, the AI accelerator at operation 313 can recommend and/or change primary device settings 354. The change to primary device settings 354 can be to allow the primary device to meet a budget, a carbon footprint goal, or a level of performance, for instance, established by the user preferences 316.

Figure 4:
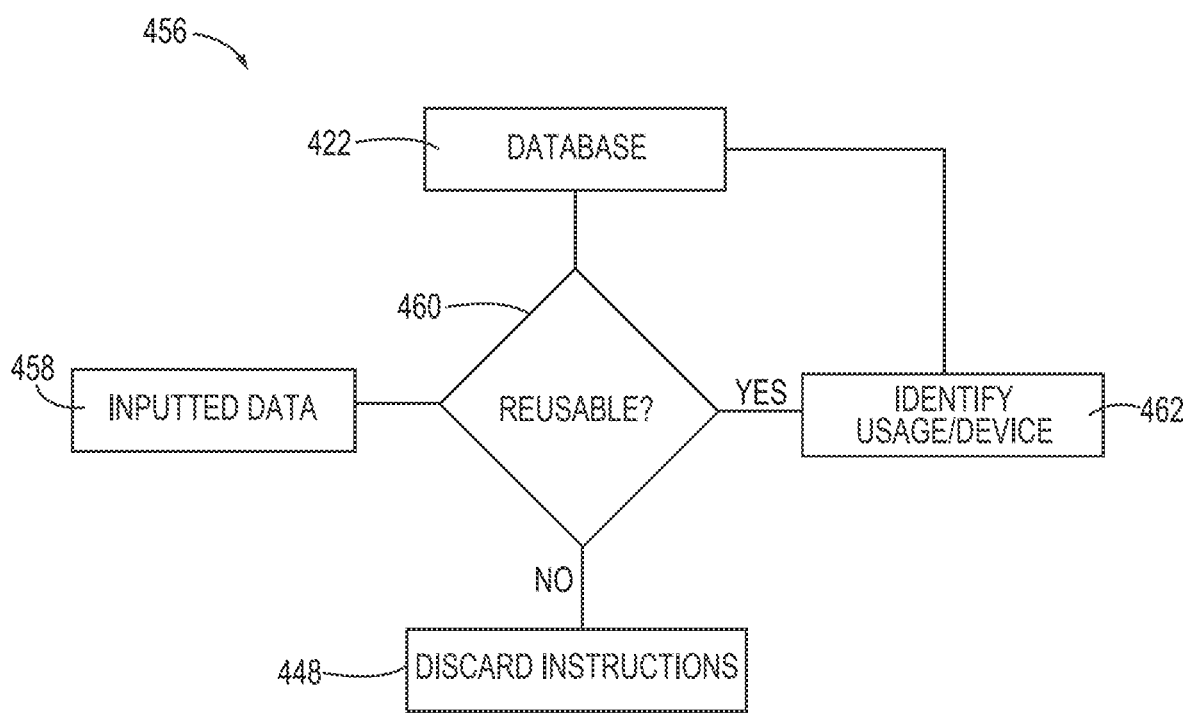
FIG. 4 is a flow diagram corresponding to determining whether a consumable can be reused in accordance with some embodiments of the present disclosure.

FIG. 4 is a flow diagram 456 corresponding to determining whether a consumable can be reused in accordance with some embodiments of the present disclosure. Inputted data 458 can include data from database 322, manufacturer data 332, sensor data 334, usage data 336, third-party data 338, and/or data from user preferences 316 illustrated in FIG. 3.

The AI acceleration component 113 of FIG. 1 and/or the AI accelerator 213 of FIG. 2 can perform an AI operation on the inputted data 458 to determine whether a consumable can be reused at operation 460.

For example, at operation 460 the AI accelerator can determine using, for instance, data from the database 422, the manufacturer data, the sensor data, the usage data, and/or the user preferences whether the consumable can be reused by a secondary device. If the AI accelerator determines at operation 460 that the consumable cannot be reused, then the AI accelerator can create and/or provide discard instructions 448 to the user. If the AI accelerator determines at operation 460 that the consumable can be reused, then the AI accelerator can identify a secondary usage of the consumable and/or a secondary device 462 that can use the consumable.

Once the AI accelerator identifies a secondary usage and/or a secondary device 462, the AI accelerator can match the secondary usage and/or the secondary device 462 to a usage and/or device in database 422. Database 422 can correspond to database 222 of FIG. 2 and/or 322 of FIG. 3. In some embodiments, database 422 can include devices located within a home, an office, a manufacturing plant, or a city that use one or more consumables. The AI accelerator can compare a secondary usage of a consumable to the usage of each device in the database 422 and identify a secondary device from the database 422 in response to matching the secondary usage of the consumable to the usage of the secondary device.

The AI accelerator can provide the one or more identified secondary devices to a user via the user interface 212 illustrated in FIG. 2. If the AI accelerator does not identify a secondary device in the database 422, the AI accelerator can provide discard instructions 448 to the user.

Figure 5:
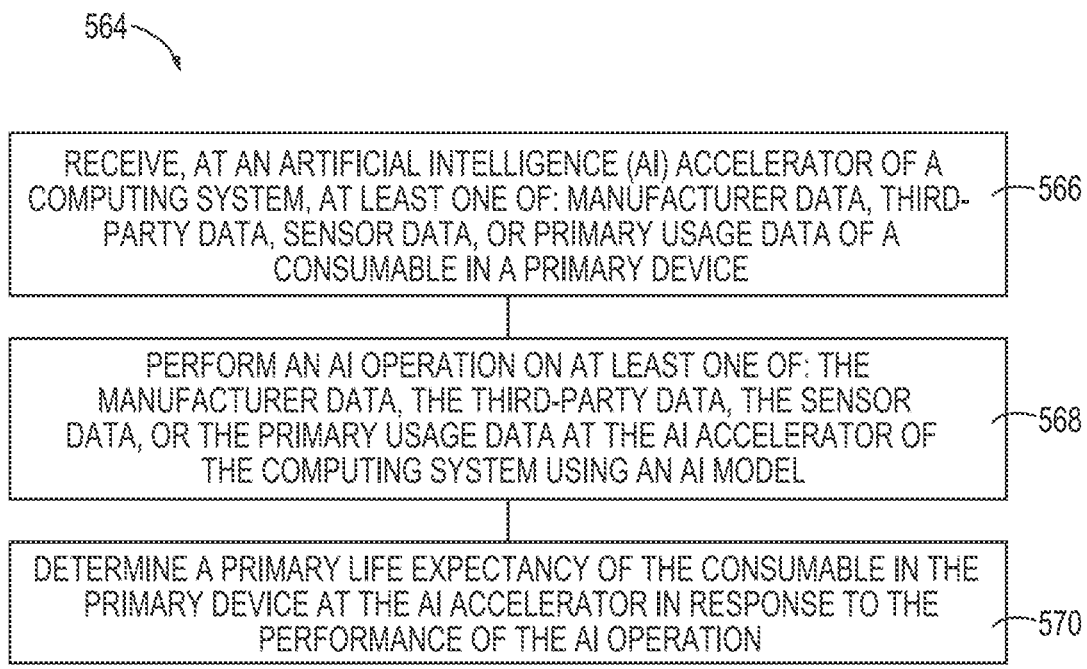
FIG. 5 is a flow diagram of a method associated with managing consumables using AI in accordance with some embodiments of the present disclosure.

FIG. 5 is a flow diagram corresponding to a method 564 associated with managing consumables using AI in accordance with some embodiments of the present disclosure. The method 564 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 564 is performed by the AI acceleration component 113 of FIG. 1 and/or the AI accelerator 213 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 566, at least one of: manufacturer data, third-party data, sensor data, or primary usage data of a consumable in a primary device can be received at an AI accelerator of a computing system. In some embodiments, the computing system, the AI accelerator, the manufacturer data, the third-party data, the sensor data, and/or the primary usage data can be analogous to computing system 100 and AI acceleration component 113 illustrated in FIG. 1 and manufacturer data 332, third-party data 338, sensor data 334, and primary usage data 336 illustrated in FIG. 3.

At operation 568, an AI operation can be performed on at least one of: the manufacturer data, the third-party data, the sensor data, or the primary usage data at the AI accelerator of the computing system using an AI model. In some embodiments, the AI model can be analogous to the AI model 214 illustrated in FIG. 2.

At operation 570, a primary life expectancy of the consumable in the primary device can be determined at the AI accelerator in response to the performance of the AI operation. The AI accelerator can determine the primary life of the consumable has ended at least partially based on at least one of: the manufacturer data, the third-party data, the sensor data, or the primary usage data of the consumable in the primary device. In some embodiments, a notification that the primary life of the consumable has ended can be displayed via a user interface. In some embodiments, the user interface can be analogous to the user interface 212 illustrated in FIG. 2.

The primary life expectancy of the consumable in the primary device can be compared to a threshold primary life expectancy of the consumable in the primary device. A notification to replace the consumable can be displayed on the user interface of the computing system in response to the primary life expectancy of the consumable being less than the threshold primary life expectancy of the consumable. In some approaches, a replacement consumable can be purchased at a particular time at least partially based on the determined life expectancy of the consumable.

In some approaches, the AI accelerator can determine a secondary usage of the consumable at least partially based on at least one of: the manufacturer data, the third-party data, the sensor data, or the primary usage data of the consumable in the primary device. The AI accelerator can also identify a secondary device configured to perform the secondary usage of the consumable. The AI accelerator can convey the identified secondary device to the user via a user interface of the computing system.

If the consumable cannot be reused in a secondary device, the AI accelerator can create discard instructions at least partially based on at least one of: the manufacturer data, the third-party data, the sensor data, or the primary usage data. The discard instructions can be displayed on the user interface of the computing system. The user interface of the computing system can also display a notification to perform a maintenance operation on the consumable at least partially based on at least one of: the manufacturer, the third-party data, the sensor data, or the primary usage data of the consumable in the primary device.

Figure 6:
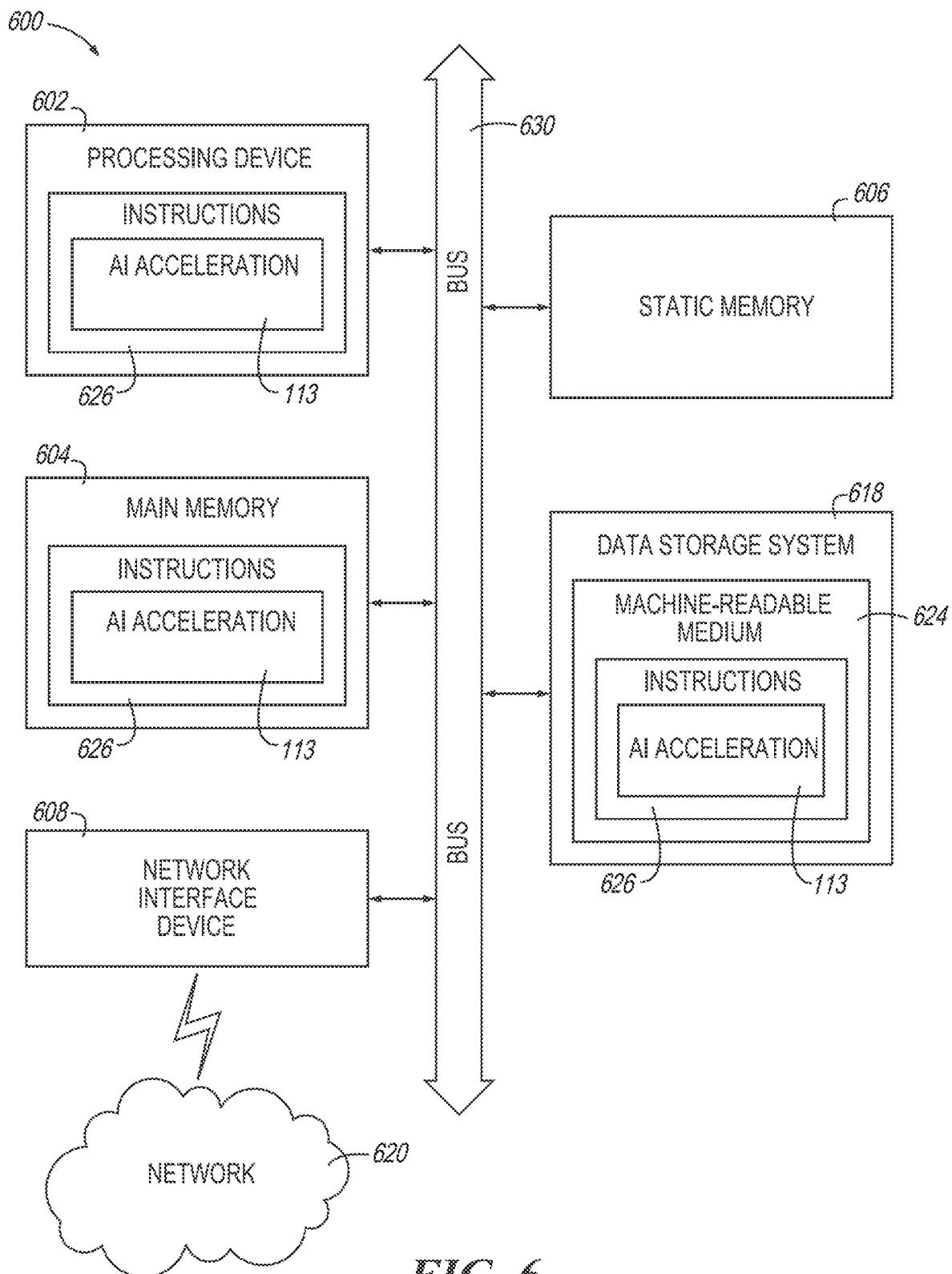
FIG. 6 is a block diagram of an example computer system in which embodiments of the present disclosure may operate.

FIG. 6 is a block diagram of an example computer system 600 in which embodiments of the present disclosure may operate. For example, FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the AI acceleration component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an AI acceleration component (e.g., the AI acceleration component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   receiving, at an artificial intelligence (AI) accelerator of a computing system, at least one of: manufacturer data, third-party data, sensor data, or primary usage data of a consumable in a primary device;
   performing an AI operation on at least one of: the manufacturer data, the third-party data, the sensor data, or the primary usage data at the AI accelerator of the computing system using an AI model;
   determining a primary life expectancy of the consumable in the primary device at the AI accelerator in response to performing the AI operation; and
   determining whether the consumable can be reused for a secondary usage, a secondary device, or both in response to performing the AI operation.

2. The method of claim 1, further comprising determining, at the AI accelerator, the secondary usage of the consumable at least partially based on at least one of: the manufacturer data, the third-party data, the sensor data, or the primary usage data of the consumable in the primary device.

3. The method of claim 2, further comprising identifying, at the AI accelerator, the secondary device configured to perform the secondary usage of the consumable.

4. The method of claim 3, further comprising conveying the identified secondary device to a user via a user interface of the computing system.

5. The method of claim 1, further comprising:
   determining, at the AI accelerator, the primary life of the consumable has ended at least partially based on at least one of: the manufacturer data, the third-party data, the sensor data, or the primary usage data of the consumable in the primary device; and
   display a notification that the primary life of the consumable has ended via a user interface of the computing system.

6. The method of claim 5, further comprising:
   creating discard instructions, at the AI accelerator, at least partially based on at least one of: the manufacturer data, the third-party data, the sensor data, or the primary usage data; and
   displaying the discard instructions on the user interface of the computing system.

7. The method of claim 1, further comprising:
   comparing the primary life expectancy of the consumable in the primary device to a threshold primary life expectancy of the consumable in the primary device; and
   displaying a notification to replace the consumable on a user interface of the computing system in response to the primary life expectancy of the consumable being less than the threshold primary life expectancy of the consumable.

8. The method of claim 1, further comprising displaying a notification to perform a maintenance operation on the consumable on a user interface of the computing system at least partially based on at least one of: the manufacturer data, the third-party data, the sensor data, or the primary usage data of the consumable in the primary device.

9. The method of claim 1, further comprising purchasing a replacement consumable at a particular time at least partially based on the determined primary life expectancy of the consumable.

10. An apparatus, comprising:
    an artificial intelligence (AI) accelerator configured to:

receive at least one of: manufacturer data, third-party data, sensor data, or primary usage data of a consumable in a primary device;
perform an AI operation on at least one of: the manufacturer data, the third-party data, the sensor data, or the primary usage data at the AI accelerator using an AI model;
determine whether the consumable can be reused for a secondary usage, by a secondary device, or both based on an output of the AI operation; and
determine the secondary usage of the consumable at least partially based on the output of the AI operation.

11. The apparatus of claim 10, wherein the AI accelerator is configured to receive a database of devices, wherein each device in the database of devices uses at least one consumable.

12. The apparatus of claim 11, wherein the AI accelerator is configured to receive at least one of: manufacturer data, third-party data, sensor data, or usage data of each consumable included in the database of devices.

13. The apparatus of claim 12, wherein the AI accelerator is configured to perform an AI operation on at least one of: the manufacturer data, the third-party data, the sensor data, or the usage data of each consumable included in the database of devices.

14. The apparatus of claim 13, wherein the AI accelerator is configured to determine the usage of each consumable included in the database of devices.

15. The apparatus of claim 14, wherein the AI accelerator is configured to compare the secondary usage of the consumable to the usage of each consumable included in the database of devices.

16. The apparatus of claim 15, wherein the AI accelerator is configured to identify the secondary device from the database of devices in response to matching the secondary usage of the consumable to the usage of the secondary device.

17. A system, comprising:
a user interface;
a memory configured to store user preferences; and
an artificial intelligence (AI) accelerator configured to:
    receive at least one of: manufacturer data, third-party data, sensor data, or primary usage data of a consumable in a device;
    receive the user preferences from the memory;
    perform an AI operation on at least one of: the manufacturer data, the third-party data, the sensor data, or the primary usage data and the user preferences at the AI accelerator using an AI model;
    determine whether the consumable can be reused for a secondary usage, by a secondary device, or both at least partially based on an output of the AI operation; and
    provide a notification, via the user interface, at least partially based on the output of the AI operation.

18. The system of claim 17, wherein the user preferences include at least one of: a budget, a carbon footprint goal, or a level of performance for the device.

19. The system of claim 18, wherein the notification includes a recommendation to change settings of the device to meet the budget, the carbon footprint goal, or the level of performance for the device.

20. The system of claim 18, wherein the notification includes a recommendation to purchase a particular type of the consumable to meet the budget, the carbon footprint goal, or the level of performance for the device.

* * * * *